(12) United States Patent
Zhu et al.

(10) Patent No.: US 9,151,025 B2
(45) Date of Patent: Oct. 6, 2015

(54) FLUID DELIVERY ASSEMBLY (2-IN AND 1-OUT, PLUS QUICK-CONNECT DIVERTER HOUSING ASSEMBLY)

(71) Applicant: Xiamen Lota International Co., Ltd., Xiamen (CN)

(72) Inventors: Chuanbao Zhu, Xiamen (CN); Liming Ye, Xiamen (CN); Yan Zhang, Xiamen (CN); Shuanglin Bai, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 76 days.

(21) Appl. No.: 13/740,999

(22) Filed: Jan. 14, 2013

(65) Prior Publication Data

US 2013/0186479 A1 Jul. 25, 2013

Related U.S. Application Data

(60) Provisional application No. 61/589,096, filed on Jan. 20, 2012.

(51) Int. Cl.
   *E03C 1/04* (2006.01)
   *E03C 1/06* (2006.01)
   *F16L 3/00* (2006.01)

(52) U.S. Cl.
   CPC .................. *E03C 1/06* (2013.01); *E03C 1/0403* (2013.01); *F16L 3/00* (2013.01); *E03C 1/0401* (2013.01); *Y10T 137/0402* (2015.04); *Y10T 137/598* (2015.04)

(58) Field of Classification Search
   CPC ............ F16L 3/00; E03C 1/06; E03C 1/0403; E03C 1/401; Y10T 137/0402; Y10T 137/598
   USPC ............... 137/315.12, 801, 15.01, 359; 4/676
   See application file for complete search history.

(56) References Cited

U.S. PATENT DOCUMENTS

| | | |
|---|---|---|
| 3,854,493 A | 12/1974 | Farrell |
| 3,911,946 A | 10/1975 | Humpert et al. |
| 4,103,709 A | 8/1978 | Fischer |
| 4,262,699 A | 4/1981 | Fabian |
| 4,667,987 A | 5/1987 | Knebel |
| 5,010,922 A | 4/1991 | Agresta |
| 5,348,048 A | 9/1994 | Schirado et al. |
| 5,797,151 A | 8/1998 | Ko |
| 5,931,200 A | 8/1999 | Mulvey et al. |
| 5,937,892 A | 8/1999 | Meisner et al. |

(Continued)

FOREIGN PATENT DOCUMENTS

| | | |
|---|---|---|
| CA | 2752177 A1 | 9/2010 |
| CN | 102333965 A | 1/2012 |

(Continued)

*Primary Examiner* — Craig Schneider
*Assistant Examiner* — Kevin Barss
(74) *Attorney, Agent, or Firm* — McDermott Will & Emery LLP

(57) ABSTRACT

The invention provides a fluid delivery assembly for use with a water discharge fixture, such as a faucet. The fluid delivery assembly includes a tube assembly, a housing and a retaining assembly. The fluid delivery assembly provides for water flow from hot and cold water inlets to the faucet. The fluid delivery assembly may be assembled by hand without the need for tools, allowing for easy replacement of the fluid delivery assembly, without the need to disassemble the faucet assembly or to replace the entire faucet assembly.

8 Claims, 19 Drawing Sheets

(56) References Cited

U.S. PATENT DOCUMENTS

| | | | |
|---|---|---|---|
| 5,983,923 A | 11/1999 | Hobbs et al. | |
| 6,073,972 A | 6/2000 | Rivera | |
| 6,085,784 A | 7/2000 | Bloom et al. | |
| 6,106,027 A | 8/2000 | Mulvey et al. | |
| 6,123,106 A | 9/2000 | Benstead | |
| 6,170,515 B1 | 1/2001 | Peterson et al. | |
| 6,195,818 B1 | 3/2001 | Rodstein et al. | |
| 6,328,067 B1 | 12/2001 | Hsiung | |
| 6,360,770 B1 | 3/2002 | Buchner et al. | |
| 6,405,749 B1 | 6/2002 | Bloom et al. | |
| 6,434,765 B1 * | 8/2002 | Burns et al. | 4/676 |
| 6,641,177 B1 | 11/2003 | Pinciaro | |
| 6,684,906 B2 | 2/2004 | Burns et al. | |
| 6,725,472 B2 | 4/2004 | Gray et al. | |
| 6,820,291 B1 | 11/2004 | Weaver | |
| 6,912,742 B1 | 7/2005 | Wang | |
| 7,032,260 B2 | 4/2006 | Hwang | |
| 7,039,966 B1 | 5/2006 | Cranston, Jr. | |
| 7,043,777 B2 | 5/2006 | Bloom et al. | |
| 7,055,545 B2 | 6/2006 | Mascari et al. | |
| 7,077,153 B2 | 7/2006 | Segien, Jr. | |
| 7,162,755 B2 | 1/2007 | Mintz et al. | |
| 7,207,075 B2 | 4/2007 | Peterson et al. | |
| 7,210,493 B1 | 5/2007 | Wang | |
| 7,231,936 B2 | 6/2007 | Chang | |
| 7,269,864 B2 | 9/2007 | Brown et al. | |
| 7,313,834 B2 | 1/2008 | Tan et al. | |
| 7,373,674 B1 | 5/2008 | Condon | |
| 7,387,137 B2 | 6/2008 | Chung | |
| 7,404,413 B2 | 7/2008 | Chang | |
| 7,406,980 B2 | 8/2008 | Pinette | |
| 7,415,991 B2 | 8/2008 | Meehan et al. | |
| 7,578,309 B2 | 8/2009 | Breda | |
| 7,698,755 B2 | 4/2010 | McNerney et al. | |
| 7,766,043 B2 | 8/2010 | Thomas et al. | |
| 7,814,927 B2 | 10/2010 | Hansen | |
| 7,819,137 B2 | 10/2010 | Nelson et al. | |
| 7,896,025 B2 | 3/2011 | Hanson | |
| 7,971,742 B2 | 7/2011 | Kreider | |
| 7,979,929 B2 | 7/2011 | Vogel et al. | |
| 8,011,384 B2 | 9/2011 | Izzy et al. | |
| 8,061,386 B2 | 11/2011 | Mueller et al. | |
| 2004/0143900 A1 | 7/2004 | Nelson et al. | |
| 2005/0063772 A1 | 3/2005 | Bladen | |
| 2005/0098221 A1 | 5/2005 | Mascari et al. | |
| 2005/0138725 A1 | 6/2005 | Hwang | |
| 2006/0101576 A1 | 5/2006 | Rhodes | |
| 2006/0117477 A1 * | 6/2006 | Rosko | 4/676 |
| 2008/0178957 A1 | 7/2008 | Thomas et al. | |
| 2008/0196776 A1 | 8/2008 | Ko | |
| 2008/0277611 A1 | 11/2008 | Esche et al. | |
| 2009/0000026 A1 | 1/2009 | Hanson | |
| 2009/0001310 A1 | 1/2009 | Hanson | |
| 2009/0032170 A1 | 2/2009 | Williams | |
| 2010/0125946 A1 | 5/2010 | Meisner et al. | |
| 2010/0155505 A1 | 6/2010 | Lopp et al. | |
| 2010/0170578 A1 | 7/2010 | Liu et al. | |
| 2010/0200613 A1 | 8/2010 | Smith et al. | |
| 2011/0115219 A1 | 5/2011 | Biris et al. | |
| 2011/0297248 A1 | 12/2011 | Nelson et al. | |

FOREIGN PATENT DOCUMENTS

| | | |
|---|---|---|
| EP | 2401513 A1 | 1/2012 |
| MX | 201 1008426 A | 9/2011 |
| WO | WO-2008086379 A1 | 7/2008 |
| WO | WO-2010099397 A1 | 9/2010 |
| WO | WO-2011155904 A1 | 12/2011 |

* cited by examiner

FLUID DELIVERY ASSEMBLY (2-IN AND 1-OUT, PLUS QUICK-CONNECT DIVERTER HOUSING ASSEMBLY)

RELATED APPLICATION

The present application for patent claims priority under 35 U.S.C. §119 to Provisional Application No. 61/589,096 entitled "FLUID DELIVERY ASSEMBLY" filed Jan. 20, 2012 ("the Provisional Application"). The Provisional Application is assigned to the assignee of the present application, and is hereby expressly incorporated by reference.

TECHNICAL FIELD

The invention relates to a fluid delivery assembly that is installed in a water discharging fixture, such as a faucet. The fluid delivery assembly includes a tube assembly defining a fluid flow path, a housing configured to receive a fluid flow cartridge, and a retaining assembly that enables the fluid delivery assembly to be easily removed or replaced.

BACKGROUND OF THE INVENTION

Fluid delivery assemblies are known, and can be found in both residential and commercial settings. In either setting, the fluid delivery assembly provides fluid flow from hot and cold water sources. The fluid is dispensed through a discharge fixture, such as a kitchen or lavatory faucet. While such fluid delivery assemblies provide some benefits, they nevertheless have certain limitations. For example, the water delivery lines attached between the water source lines and the faucet typically require tools for installation of the faucet assembly. Also, conventional fluid delivery assemblies typically have inlet lines molded together or pre-formed with a cartridge housing, such that replacing the inlet lines requires replacing the entire faucet assembly. Examples of fluid delivery assemblies having these and other limitations are found in U.S. Pat. No. 7,032,260 to Hwang and U.S. Pat. No. 6,123,106 to Benstead.

The present invention is intended to solve the limitations of conventional fluid delivery assemblies discussed above and other problems, and to provide advantages and aspects not provided by prior fluid delivery assemblies. Some of the features and advantages of the present invention are described in the following detailed description and the accompanying drawings.

SUMMARY OF THE INVENTION

The present invention is directed to a fluid delivery assembly that includes a number of components that interact to define a replaceable fluid flow path from a fluid source (such as a hot and cold water source) to a fluid discharge assembly (such as a faucet). These interacting components may include a tube assembly (e.g., a plastic tube assembly), a housing (e.g., a cartridge housing), and a retaining assembly (e.g., a threaded mounting shank and a cooperatively threaded mounting nut). These components enable the fluid delivery assembly to be easily attached to or detached from a faucet assembly by hand, that is, without the use of tools. These components may be separate and distinct such that an individual component may be removed and/or replaced.

An important feature of the invention is that its fluid delivery assembly is mounted completely below its related countertop or deck. It follows that the installation or removal of the fluid delivery assembly occurs completely below the countertop or deck. This permits such installation or removal of the fluid delivery assembly without removing or replacing portions of the faucet assembly above the deck.

According to an aspect of the invention, the fluid delivery assembly includes a tube assembly having a plurality of tubes, a housing configured to receive a fluid flow cartridge assembly, and a retaining assembly. The tube assembly may be formed of any suitable material, including but not limited to PERT. The tube assembly may include three tubes, the first and second tubes each providing water from a water source line to the cartridge housing. For example, the first and second tubes may connect hot and cold water source lines to the cartridge housing. The third tube provides a water pathway from the cartridge housing to a second water discharge assembly, such as a side spray hose. The tube assembly may be formed such that portions of two or more of the plurality of tubes are molded together in one segment.

The retaining assembly includes a securing member that has a threaded portion. The securing member is movable up and down a portion of the length of the tube assembly, and is also rotationally movable around the circumference of the tube assembly. The retaining assembly also includes a mounting member that has a threaded portion. As the securing member is rotated by hand, the threaded portions of the securing member and the mounting member cooperatively engage with each other to secure the tube assembly to the housing. The securing member and the mounting member include sufficient threading to ensure a precise and well-sealed connection between the tube assembly and the end body. Preferably, the securing member is externally threaded and the end body is internally threaded. Alternatively, the securing member may be internally threaded and the end body may be externally threaded. The housing, the tube assembly and the retaining assembly are separate components that are not integrally formed together, such as by over-molding or adhesively bonding. Therefore, any component may be removed and/or replaced while keeping the other components as part of the faucet assembly.

In an alternative embodiment, the tube assembly may include four tubes. The first and second tubes connect hot and cold water source lines to the cartridge housing and the third tube provides a water pathway from the cartridge housing to a second water discharge assembly, such as a side spray hose. The fourth tube connects to a water delivery spout, such as a water faucet, for example. One end of the third and fourth tubes may connect to a diverter valve assembly.

Other features and advantages of an aspect of the invention will be apparent from the following specification, taken in conjunction with the following drawings.

DETAILED DESCRIPTION

This invention may take many different forms. The current description and drawings teach only a few of the many different forms or embodiments of the invention. It should be understood that the present disclosure is to be considered as disclosing only a few, non-limiting examples of the principles of the invention. This disclosure is not intended to limit the broadest aspects of the invention to the illustrated embodiments.

Figure 1:
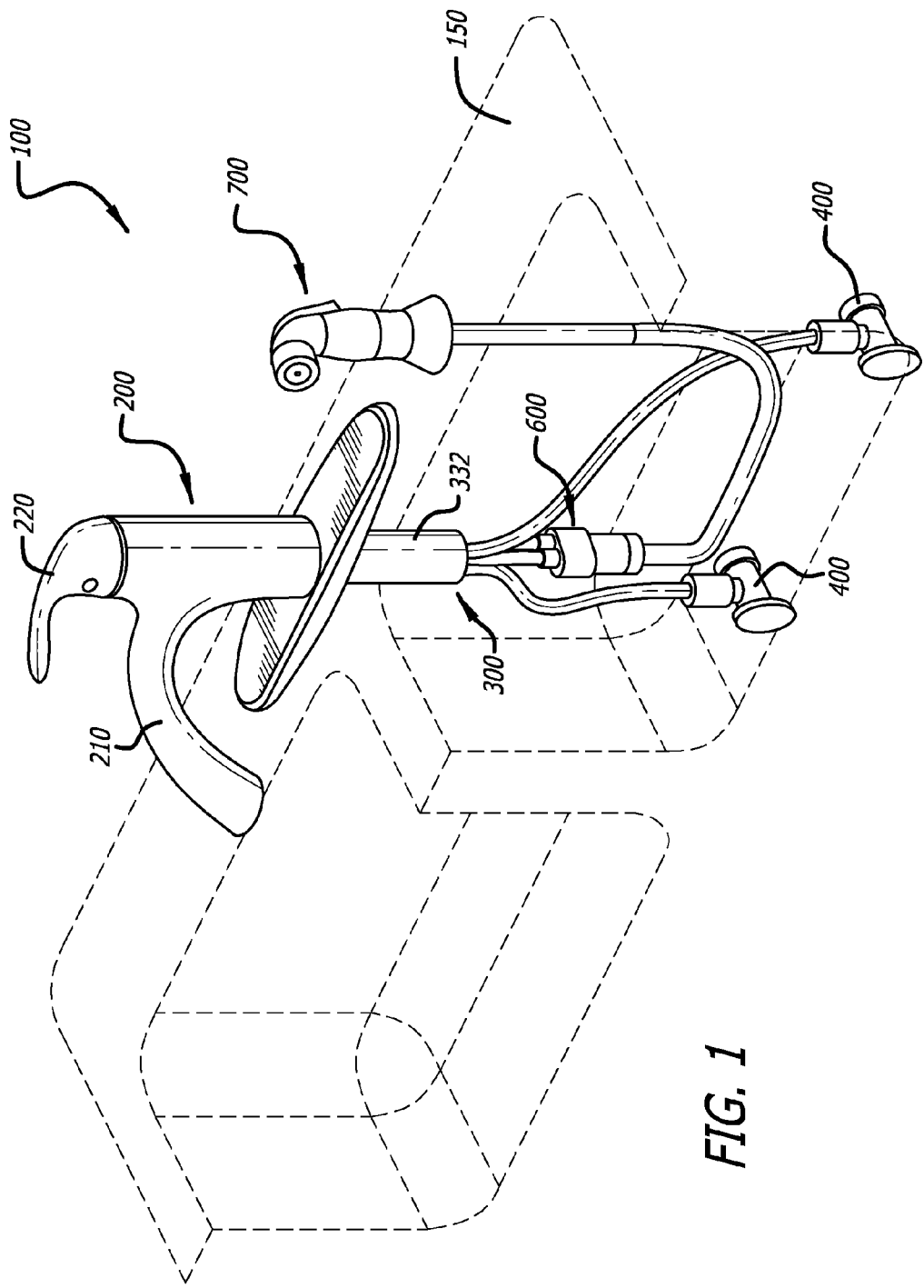
FIG. 1 is a perspective view of the invention, connected to a faucet, to form an assembly.

FIG. 1 illustrates a faucet system 100 for delivery of water to a user. The faucet system 100 includes a faucet assembly 200, a diverter valve assembly 600, a fluid delivery assembly 300, a sprayer assembly 700 and fluid inlet valves 400. The faucet assembly 200 includes a delivery spout 210 and a handle 220 that are mounted as an assembly on top of a countertop 150 (shown in broken line form). The fluid delivery assembly 300 is connected between the faucet assembly 200 and the fluid inlet valves 400. One inlet valve 400 may provide hot water from a hot water source (e.g., water heater) and the other inlet valve 400 may provide cold water from a cold water source (e.g., well or city water). Alternatively, faucet system 100 may be any other suitable fluid delivery system (e.g., a shower system).

The diverter valve assembly 600 is connected to the fluid delivery assembly 300, the faucet assembly 200 and the sprayer assembly 700. The diverter valve assembly 600 operates to selectably provide water from the fluid delivery system 300 to the faucet assembly 200 and the sprayer assembly 700. For example, water may flow out of the faucet assembly 200 when the handle 220 is in the on position, but may cease flowing out of the faucet assembly 200 and begin flowing out of the sprayer assembly 700 when the sprayer assembly 700 is activated.

Figure 2:
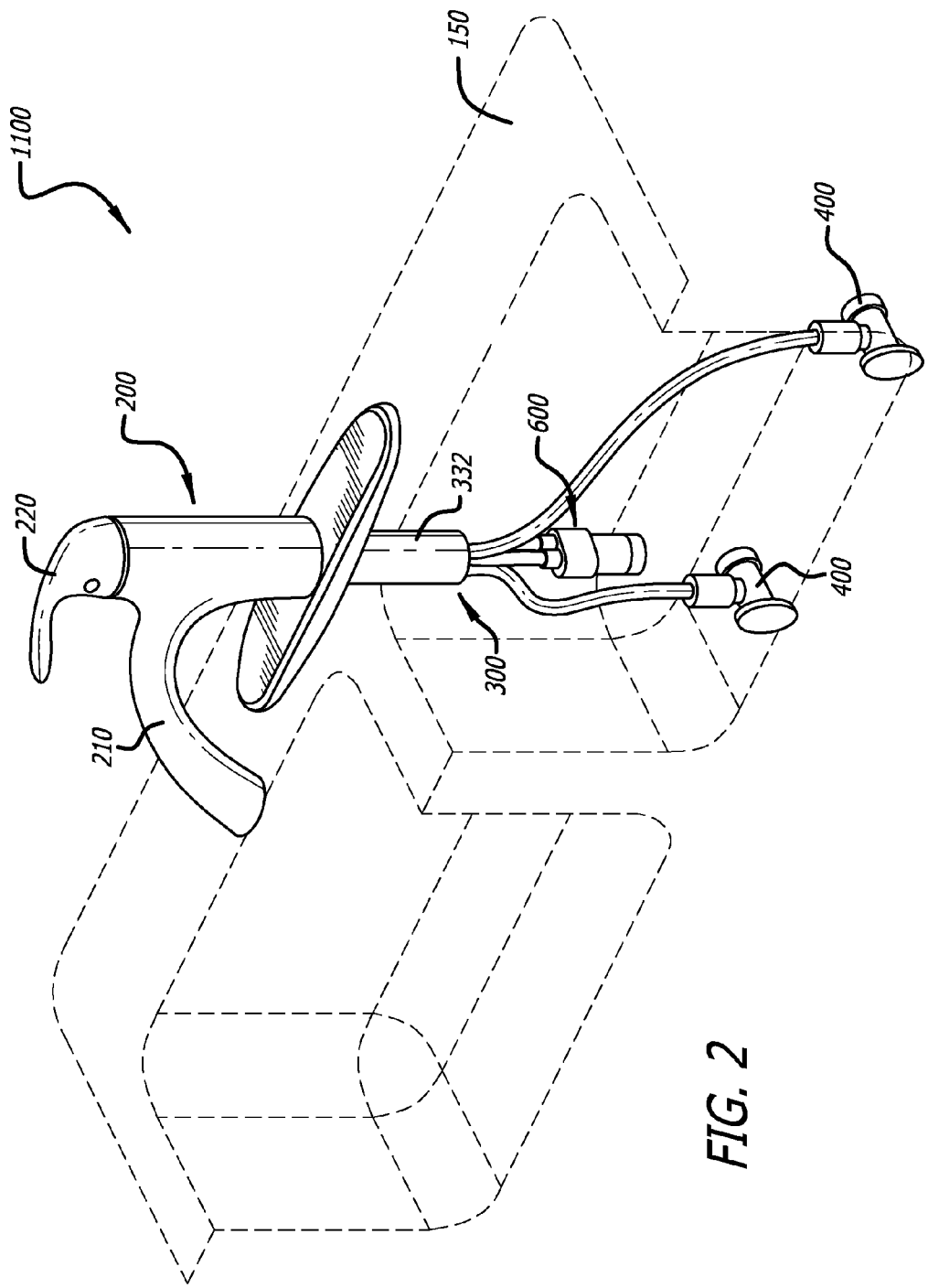
FIG. 2 is a perspective view of another embodiment of the invention, connected to a faucet, to form an assembly.

FIG. 2 illustrates another faucet system 1100 for delivery of water to a user. The faucet system 1100 includes the faucet assembly 200, a plug 680, the fluid delivery assembly 300 and fluid inlet valves 400. The faucet system 1100 is similar to the faucet system 100 except that it does not have a sprayer assembly. The plug 680 is connected to the fluid delivery assembly 300 and the faucet assembly 200. The plug 680 operates to provide water from the fluid delivery assembly 300 to the faucet assembly 200.

Figure 3:
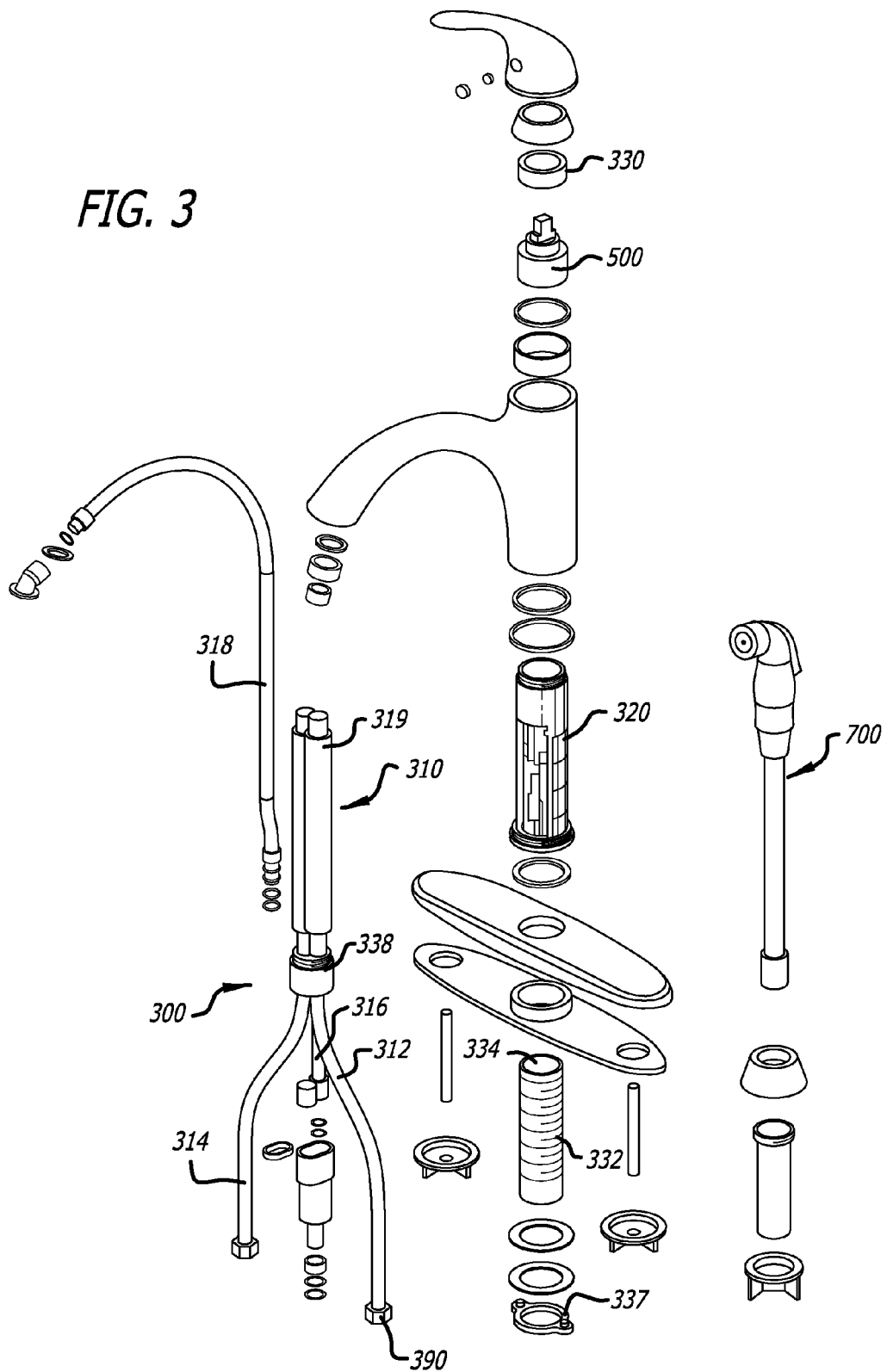
FIG. 3 is an exploded perspective view of the assembly of FIG. 1.

Referring to FIG. 3, faucet system 100 with an embodiment of a fluid delivery assembly 300 is illustrated. Fluid delivery assembly 300 has a tube assembly 310 consisting of a first tube 312, a second tube 314 and a third tube 316. First and second tubes 312, 314 are connected to hot and cold water inlets, and third tube 316 is connected to a sprayer assembly 700, such as a side sprayer. The first tube 312 and the second tube 314 are molded together at a molded junction portion 319.

Thus, first 312 and second tubes 314 are permanently fixed or fused within molded junction portion 319. The molded junction portion 319 also has a receiving channel 325 (FIG. 21) that is configured to slidably receive the third tube 316. As may also be seen in FIG. 21, the receiving channel 325 has a stop surface or stop member 323, which is configured to engage a portion of third tube 316 as the third tube 316 is moved through the receiving channel 325. The stop member 323 thus ensures that the third tube 316 is properly positioned within the molded junction portion 319, without having to see its positioning. Instead, upon engagement of a flat portion of the third tube 316 against the stop member 323, the user is provided with tactile and audible confirmation of the contact of an end portion 315 of the third tube 316 with the stop member 323 of the molded junction portion 319.

In the manufacturing process, the first and second tubes 312, 314 are placed adjacent to each other. The molded junction portion 319 and its integral receiving channel 325 are formed by a molding process. After the molded junction has cooled and solidified, the third tube 316 may be inserted into the receiving channel 325.

Figure 21:
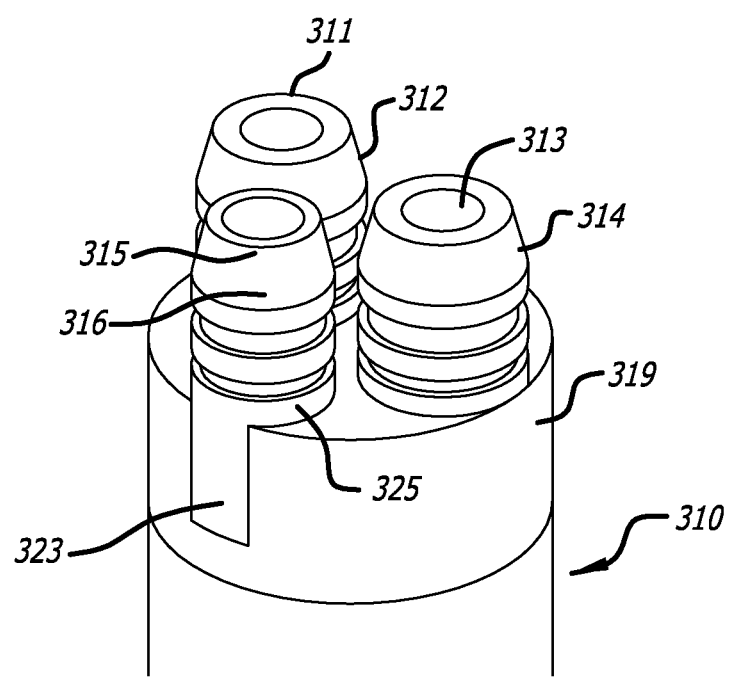
FIG. 21 is a perspective view of a portion of a tube assembly.

Preferably, as seen in FIG. 21, the first, second and third tubes 312, 314, 316 and their respective end portions 311, 313, 315, are configured in a triangular shaped pattern within the molded junction portion 319. This contrasts with conventional molding processes, where a plurality of tubes are molded in-line. A triangular pattern of the first, second and third tubes 312, 314, 316 provides design and manufacturing efficiencies, because the same tooling may be used to mold a two-tube assembly and the three-tube assembly 310. A three-tube assembly may be turned into a two-tube assembly by eliminating the receiving channel 325, or by eliminating the third tube 316.

The triangular pattern (see FIG. 21) allows the two inlet tubes 312, 314 and the one outlet tube 316 to be directly connected to the inlet and outlet mating cavities of a standard fluid flow cartridge 500 (see FIG. 3). This pattern eliminates variation in the relative position of these three tubes 312, 314, and 316, and thereby eliminates the need to design different fluid flow cartridges for different tube configurations or positions.

As indicated above, in this embodiment, the first 312 and second tubes 314 are attached to each other by a molded junction portion 319, and the third tube 316 is slidably retained within the receiving channel 325. Alternatively, however, it should be understood that the first, second and third tubes 312, 314, 316 may be attached to each other by any standard attachment means, such as by a clamp, a band or adhesive.

Figure 11:
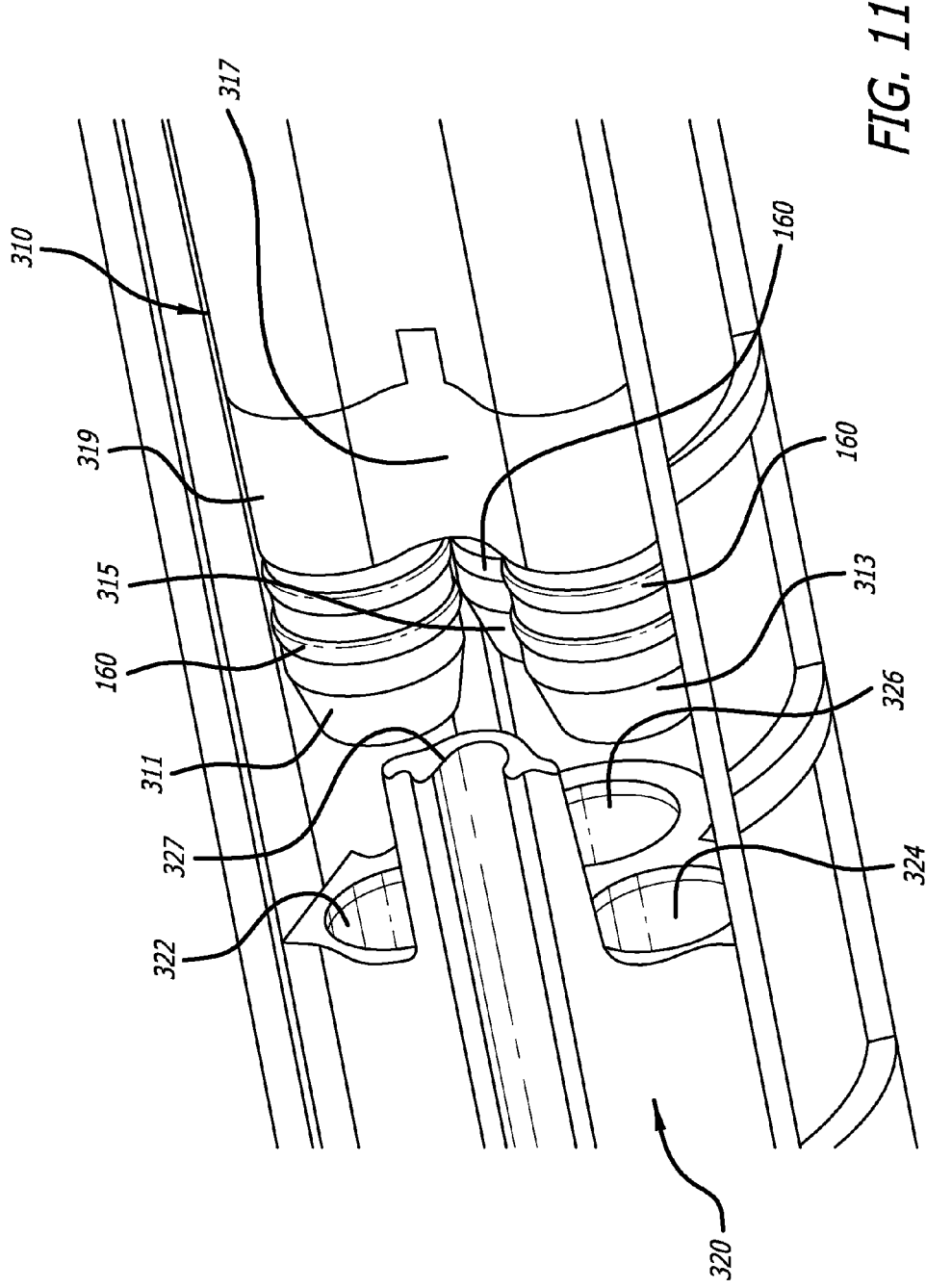
FIG. 11 is a cut away perspective view of a portion of the fluid delivery assembly of FIG. 7.

As may best be seen in FIG. 11, the molded junction portion 319 also includes a first alignment member 317. The first alignment member 317 may be a cavity, a channel, a notch or a projecting member. In this embodiment, however, as may best be seen in FIG. 11, the first alignment member 317 is a channel. The purpose of the first alignment member 317 will be explained in detail below.

The fluid delivery assembly 300 may also include a housing 320 (FIGS. 11 and 12) that is configured to receive end portions 311, 313, and 315 of the three tubes 312, 314, and 316 respectively. As may best be seen in FIG. 11, the end portions 311, 313, 315 may each include one or more sealing members 160. In this embodiment, the sealing members 160 have the function and are shaped similarly to conventional O-rings.

FIG. 11 shows a portion of this housing 320 in more detail. Particularly, FIG. 11 shows that housing 320 includes fluid channels 322, 324, 326. These fluid channels 322, 324, and 326 are sized and shaped to receive the end portions 311, 313, 315 of the tubes 312, 314, 316, respectively.

The housing 320 (FIG. 11) also includes a second alignment member 327 that is designed to fit in a complementary or mating manner with the first alignment member 317. As noted above, the first alignment member 317 of this embodiment (shown in FIG. 11) is a curvilinear channel formed in the molded junction portion 319. To ensure a complementary or mating engagement with this first alignment member 317, the second alignment member 327 shown in FIG. 11 is a projecting member that is sized and shaped to fit snugly within the first alignment member 317.

The first and second alignment members 317, 327 allow the tube assembly 310 to be connected to the housing 320 without visual confirmation by the user. This is because the engagement of the first alignment member 317 with the second alignment member 327 provides the user with either tactile feedback (such as the feel of a friction fit) or an audible click (resulting from a locking into place). Both the tactile and the audible feedback arises from the secure engagement of the tube assembly 310 with the housing 320. This feature allows the user to confidently connect the tube assembly 310 into the housing 320 in difficult-to-see areas, such as in a deep, low-level cabinet that houses a sink faucet assembly.

As a result, an installer can blindly insert the tube assembly 310 into the housing 320 in any orientation. The user then rotates the tube assembly 310 within the housing 320 while pushing inward on the tube assembly 310, until the user feels and/or hears the engagement of the first alignment member 317 with the second alignment member 327.

Figures 13, 14:
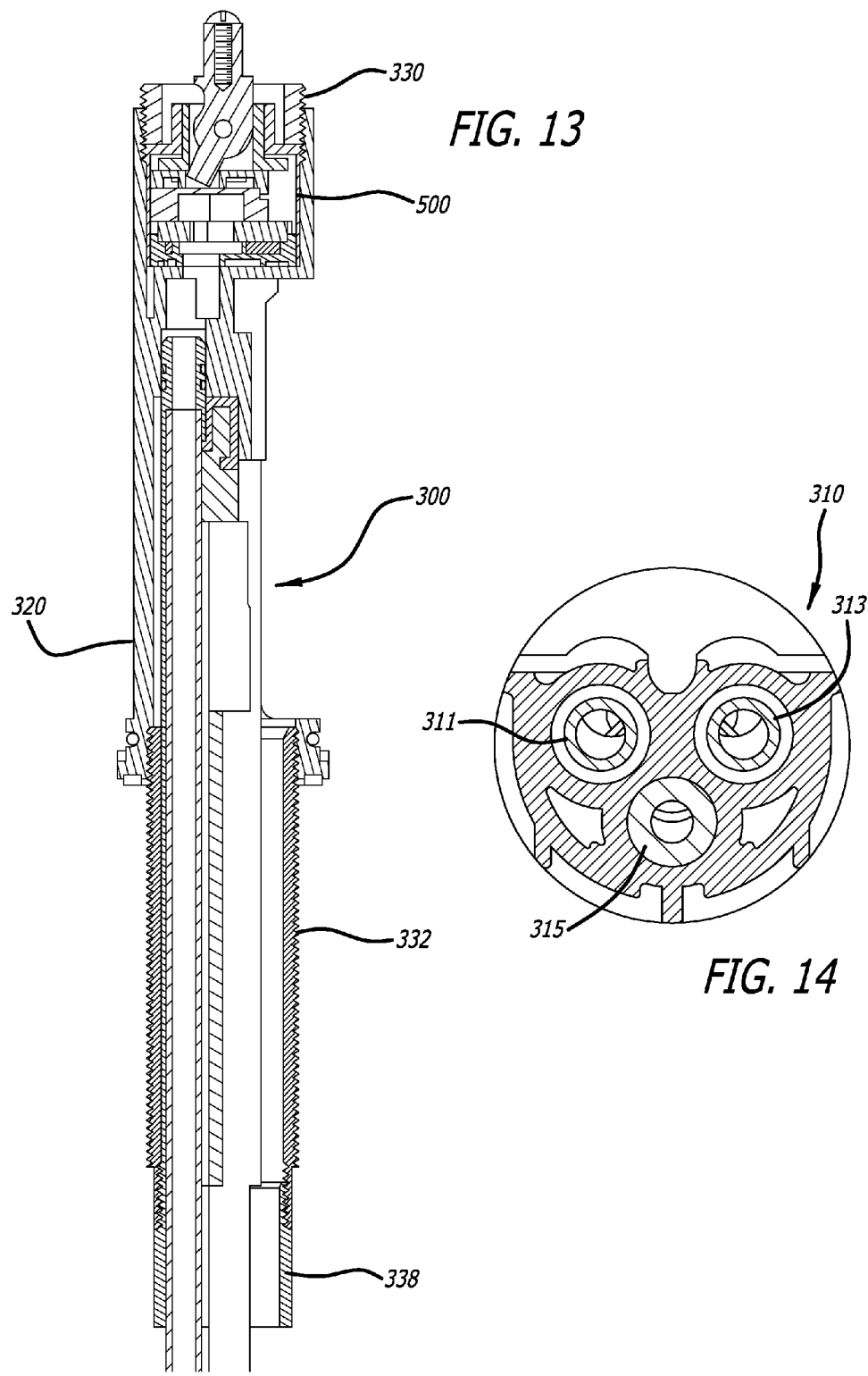
FIG. 13 is a cross-sectional side view of the fluid delivery assembly of FIG. 10.
FIG. 14 is a cross-sectional top view of a tube assembly.

Proper alignment of the tube assembly 310 may also be ensured in an alternate manner, i.e., by varying the size and/or shape of the end portions 311, 313, 315 of the first, second and third tubes 312, 314, 316. As but one example, the end portions 311 and 313 of the first and second tubes 312 and 314, respectively, may have a larger diameter than the end portion 315 of the third tube 316 (see FIG. 14). The fluid channels 322, 324, 326 are correspondingly sized and shaped to receive the differently-sized end portions 311, 313, 315 of the first, second and third tubes 312, 314, 316.

Because the fluid channel 326 is only able to receive the smaller diameter end portion 315 of the third tube 316, the tube assembly 310 is properly engaged with the housing 320 with only one specific orientation of the tube assembly 310 in relation to the housing 320. This provides further tactile confirmation that the tube assembly 310 is properly oriented and engaged with the housing 320.

Alternatively, the end portions 311, 313, 315 and the mating cavities 322, 324, 326 may be identically or nearly-identically sized and shaped, and proper orientation of the tube assembly 310 may depend upon the first and second alignment members 317, 327. Any combination of these alignment features prevents the tube assembly 310 from being inserted in an improper orientation, thereby eliminating the need for a plumber or household installer to disassemble and reassemble the fluid delivery assembly 300 as a result of improper orientation of the tube assembly 310.

For example, if a two-tube assembly was 180 degrees out of alignment, the faucet operation would be the opposite of what a user would expect (e.g., turning a faucet handle in the hot direction would yield cold water, while turning the faucet handle in the cold direction would yield hot water).

As may be seen in FIG. 3, the fluid delivery assembly 300 may also include a hold down nut 330. The hold down nut 330 is a separate component that is configured to connect to the top end of the housing 320, in order to hold a fluid flow cartridge 500 in place. For example, the hold down nut 330 may have external threading that corresponds to internal threading at the top of the housing 320. As a result, the hold down nut 330 may be securely connected to the housing 320 by threading the hold down nut 330 onto the housing 320 using finger tightening methods, or with hand tools. The threads on these two components may of course be reversed. Particularly, internal threads on the hold down nut 330 may engage external threads on the housing 320.

The top portion of housing 320 is preferably configured of a common size, shape, and internal threading. As a result, the hold down nut 330 may be used in a wide variety of fluid delivery assemblies 300. This allows the same components to be used in multiple fluid delivery assemblies, which simplifies manufacturing and distribution, and lowers costs.

Figure 12:
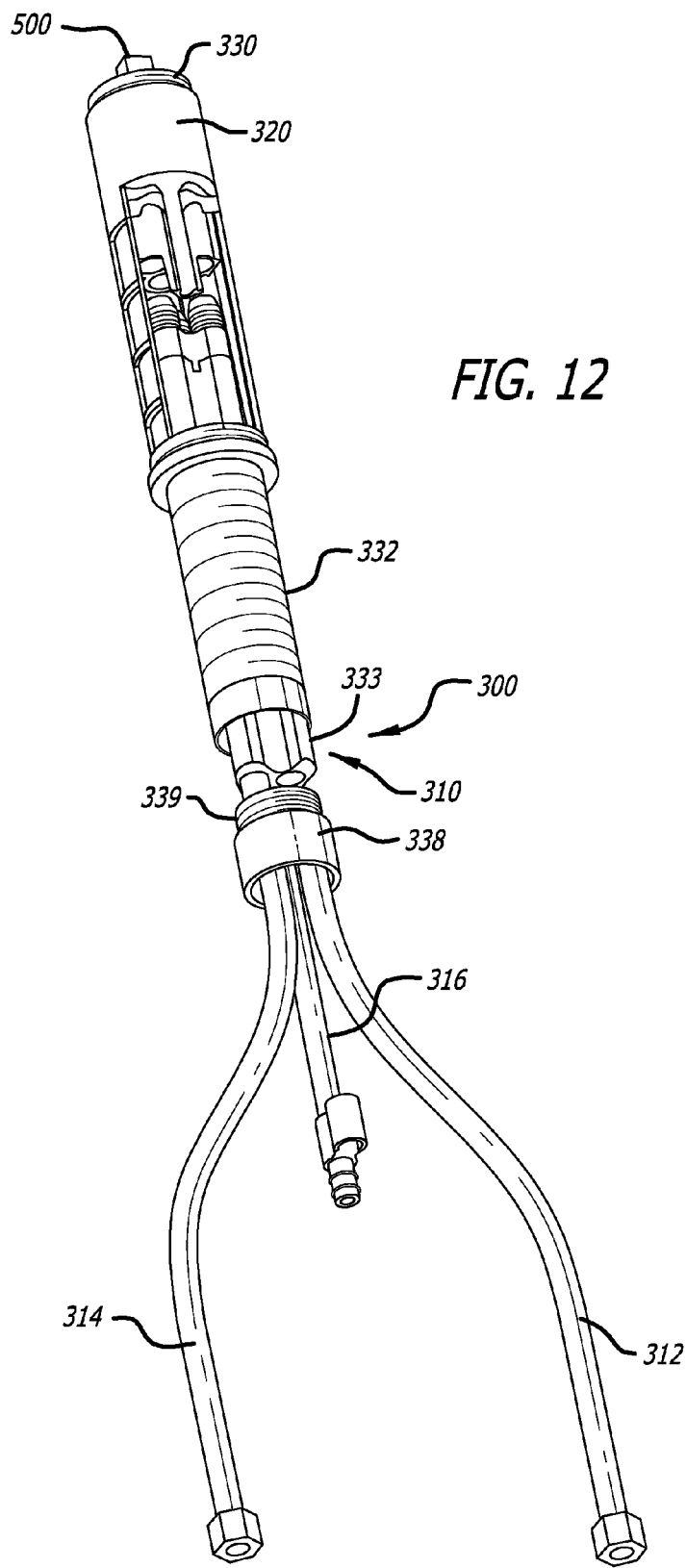
FIG. 12 is another perspective view of the fluid delivery assembly of FIG. 7.

As may best be seen in FIG. 12, a mounting member 332 and a securing member 338 are provided. The mounting member 332 and the securing member 338 are made of any desired material, such as brass or copper. The mounting member 332 and the securing member 338 may be considered to be a retaining assembly 370.

The mounting member 332 is configured to be fixed in place, such as by being secured directly to a countertop 150 or to a faucet assembly 200 (see FIG. 1). As seen in FIG. 3, the mounting member 332 is a hollow cylindrical mounting shank 334 with external threads. The mounting member 332 can be secured against the bottom of a countertop by a collar 337.

The securing member 338 may be any securing member that cooperatively engages with the mounting member 332 to secure the tube assembly 310 to the mounting member 332. For example, the securing member 338 may be a threaded mounting nut, as shown in FIG. 3. The illustrated mounting member 332 has an internally threaded portion 333, and the securing member 338 has an externally threaded portion 339. The internally threaded portion 333 and the externally threaded portion 339 cooperatively engage to secure the securing member 338 to the mounting member 332. This locks the tube assembly 310 into the mounting member 332.

The mounting member 332 is configured to receive at least a portion of the housing 320 and a portion of the tube assembly 310. For example, the housing 320 may be seated within the faucet assembly 200 and external threads of the mounting member 332 may by threadably mated with internal threads of the housing 320, such that a portion of the housing 320 overlaps a portion of the mounting member 332. In addition, the molded junction portion 319 of the tube assembly 310 may be seated entirely within the mounting member 332.

The fluid delivery assembly 300 may be assembled by inserting the mounting member through a bore in a countertop 150 and securing the mounting member 332 to the bottom of the countertop 150. The housing 320 is threaded onto the fixed mounting member 332. The tube assembly 310 is slidably moved into the mounting member 332 until the first, second, and third tube end portions 311, 313, 315 of the tube assembly 310 are fully engaged with the first, second, and third fluid channels 322, 324, 326 of the housing 320.

The securing member 338 is then slidably moved up the tube assembly 310 until it engages the mounting member 332. The securing member 338 is then rotated by hand, and not with the use of tools, to thread the securing member 332 onto the mounting member 338. This secures the tube assembly 310 to the housing 320. First and second tubes 312, 314 are connected to hot and cold water inlet valves 400, such as with a pressure nut 390, for example. These inlet valves 400 are also known as angle valves 400. Third tube 316 is connected to a fluid discharge fixture, such as a sprayer assembly 700 (e.g., side sprayer).

Figure 4:
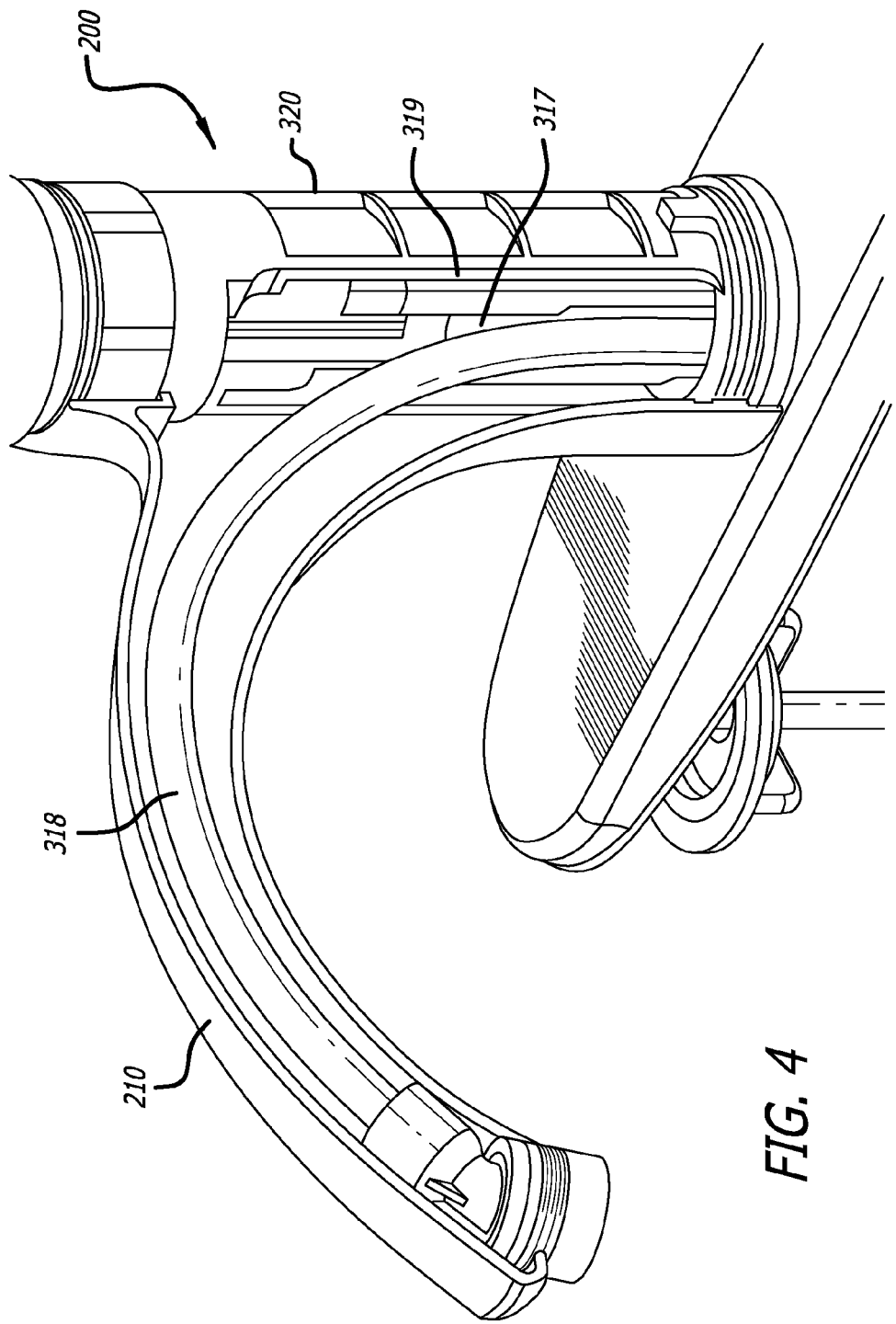
FIG. 4 is a partially cut away perspective view of the faucet portion of the assembly of FIG. 1.
Figure 5:
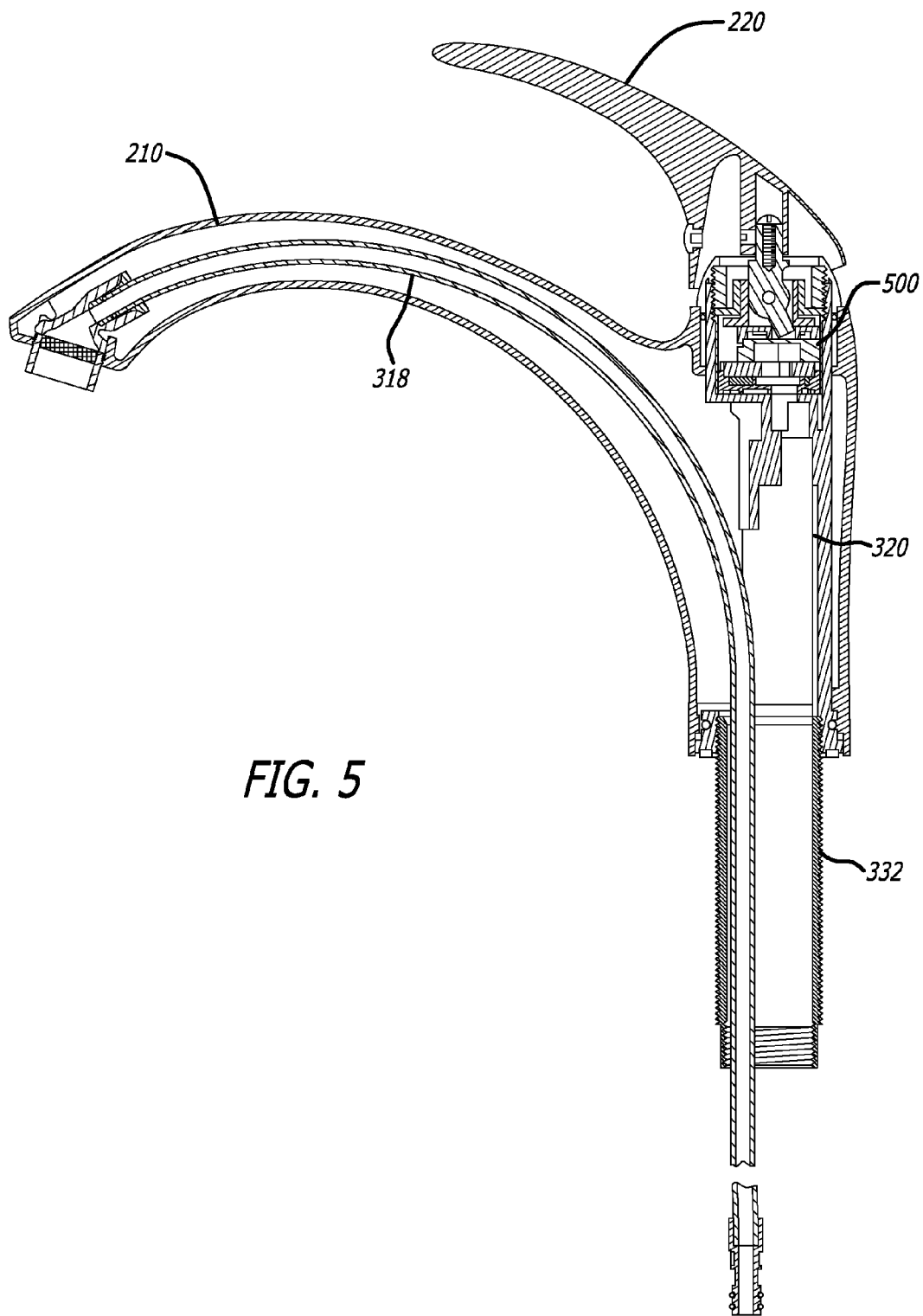
FIG. 5 is a cross-sectional side view of the faucet portion of the assembly of FIG. 1.
Figure 6:
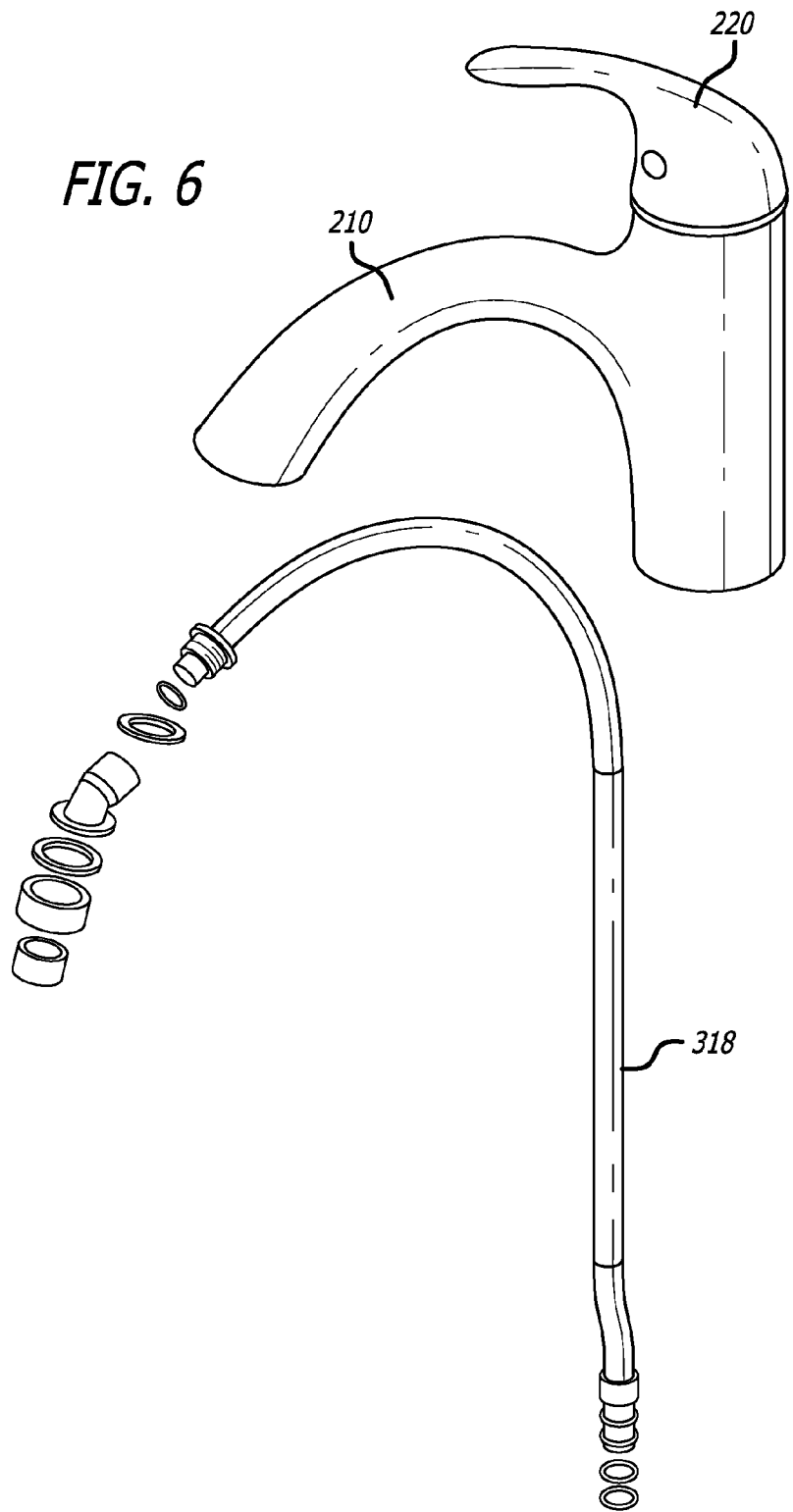
FIG. 6 is an exploded perspective view of the assembly of FIG. 5.

As shown in FIGS. 3 and 18-20, the fluid delivery assembly 300 may further include a fourth tube 318. Alternatively, the fourth tube 318 may be part of the faucet assembly 200. The fourth tube 318 is positioned through the delivery spout 210 of the faucet assembly 200 as a fluid path (see FIGS. 4-6). The first alignment member 317 of the molded junction portion 319 (FIG. 4) is configured to receive the fourth tube 318. In addition to interfacing with the second alignment member 327 of the housing 320, the first alignment member 317 may also align the fourth tube 318 so that it is positioned to pass through the fluid delivery assembly 300.

For example, the first alignment member 317 shown in FIG. 11 is a curvilinear channel in the molded junction portion 319, and the second alignment member 327 shown in FIG. 11 is a curvilinear projecting member that is sized and shaped to fit just within the curvilinear channel 317 on the molded junction portion 319. The first and second alignment members 317, 327 are further configured to receive the fourth tube 318, thereby allowing the fourth tube 318 to pass through the housing 320, the mounting member 332 and the retaining member 338. An end of the fourth tube 318 may be connected to a diverter assembly 600.

Figure 7:
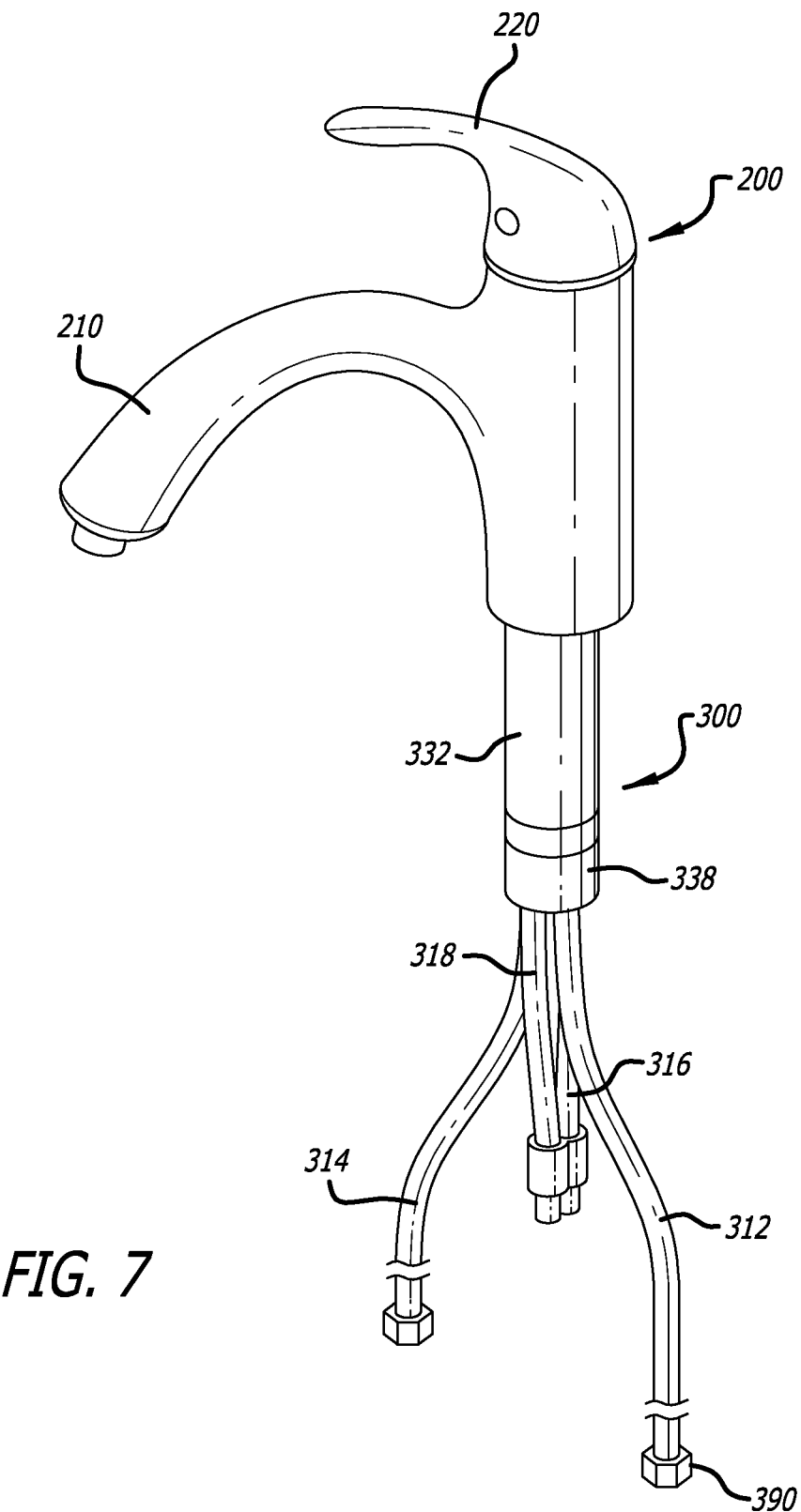
FIG. 7 is a perspective view of a fluid delivery assembly, connected to a faucet, to form an assembly.
Figure 8:
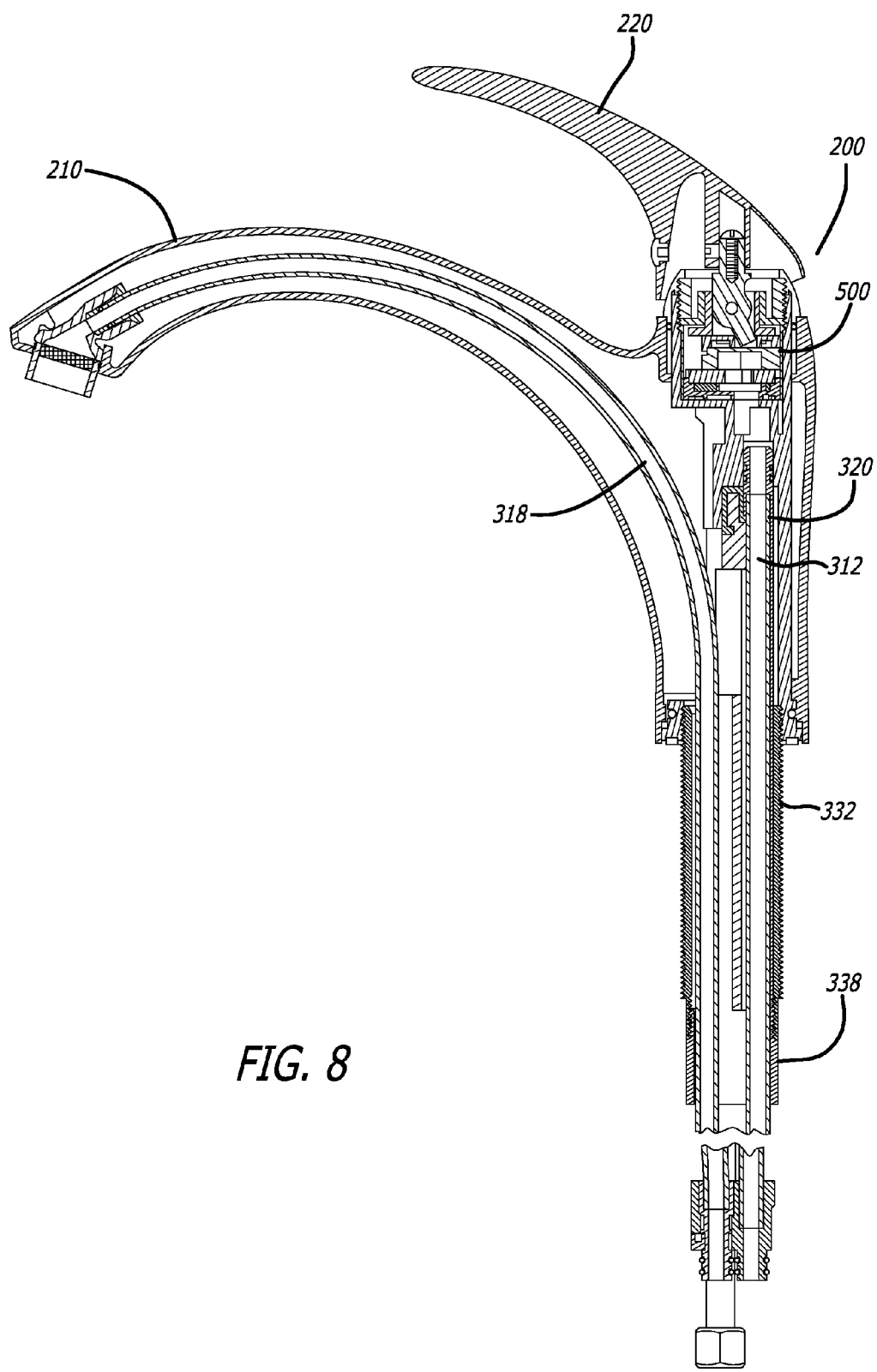
FIG. 8 is a cross-sectional side view of the assembly of FIG. 7.
Figure 9:
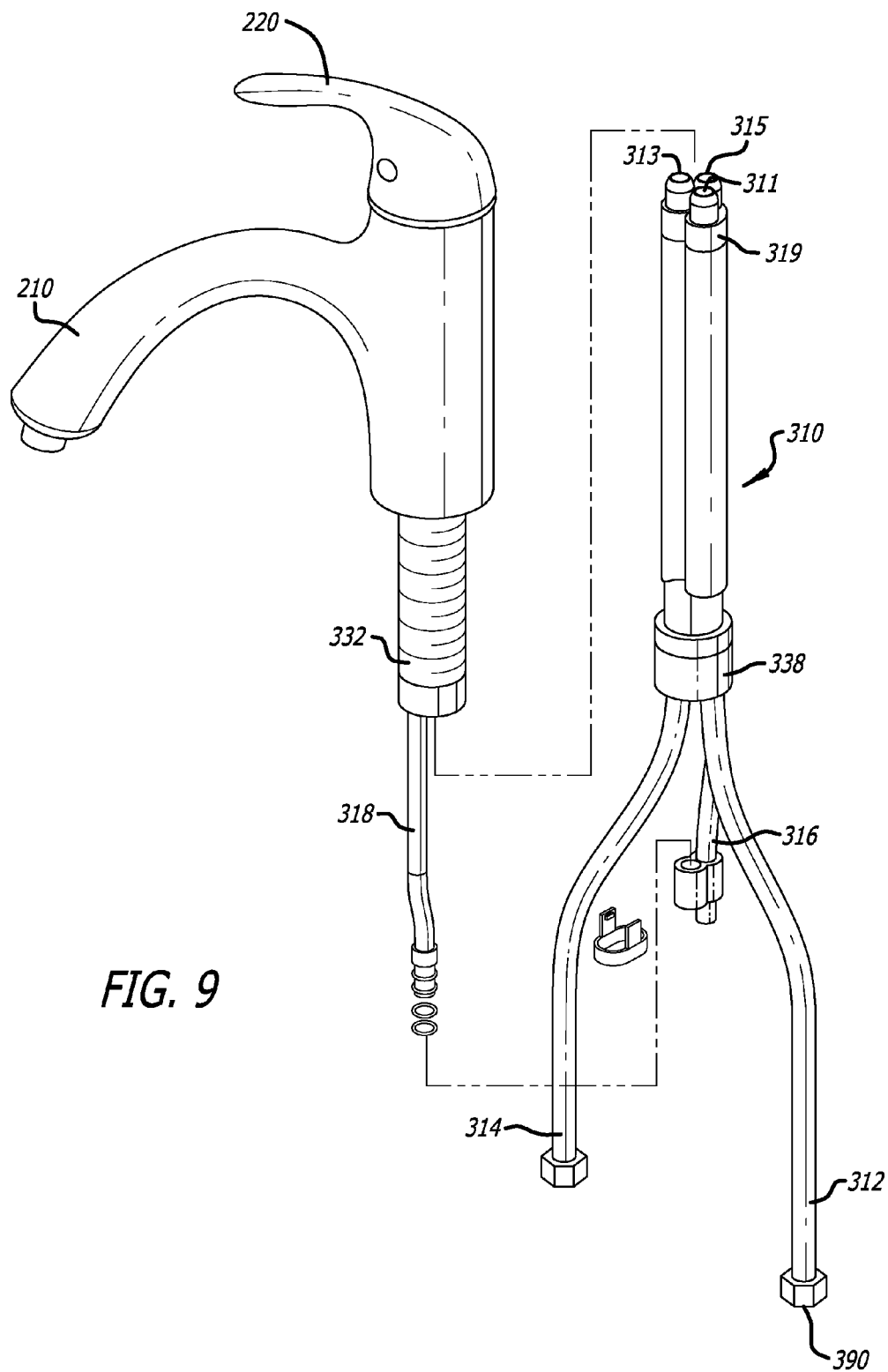
FIG. 9 is an exploded perspective view of the assembly of FIG. 7.
Figure 10:
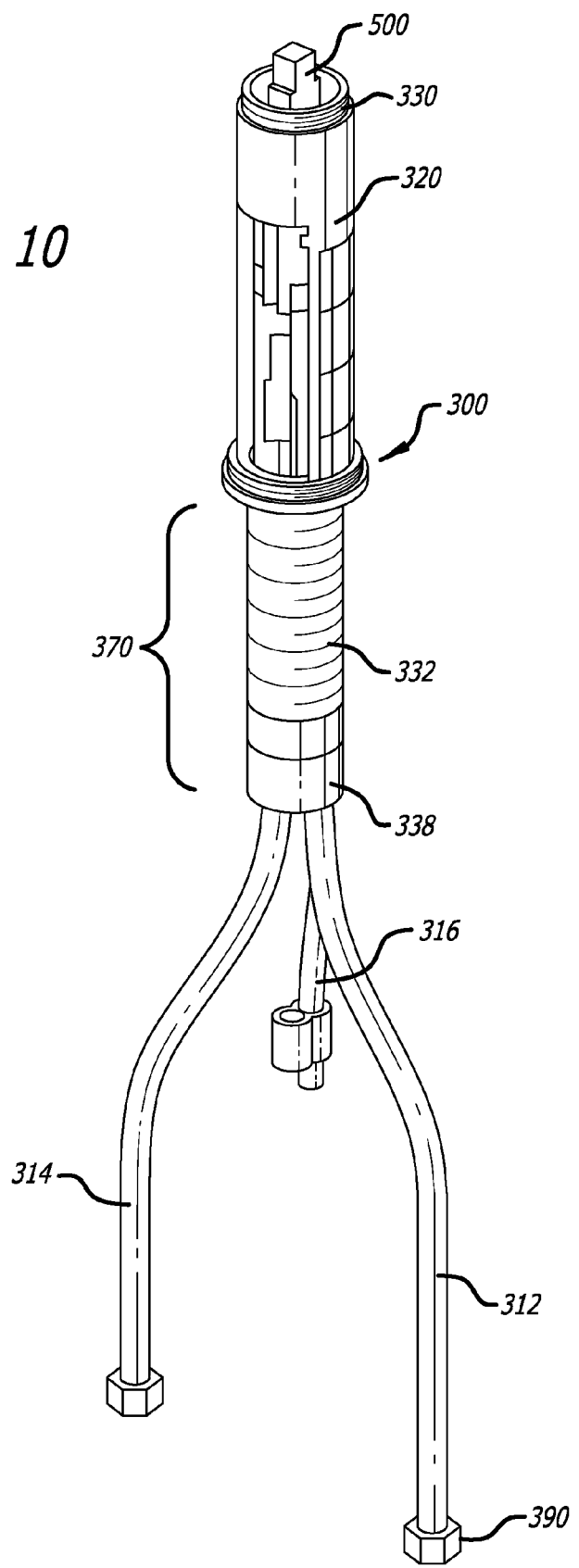
FIG. 10 is a perspective view of the fluid delivery assembly of FIG. 7.

FIGS. 7-9 show a fluid delivery assembly 300 connected to a faucet assembly 200. As particularly shown in FIG. 9, the tube assembly 310 may be easily disconnected and removed from faucet assembly 200 without any disassembly of faucet assembly 200. As further seen in FIGS. 10, 12 and 13, a fluid flow cartridge 500 may be inserted into housing 320 and secured by a hold down nut 330. Therefore, the fluid flow cartridge 500 may be removed and/or replaced without any disassembly of the faucet system 100 beneath the countertop 150, or without having to remove the fluid delivery assembly 300 from the faucet system 100.

FIGS. 15-18 show a diverter assembly 600. While this diverter assembly 600 may be used with the above, previously described embodiments, the diverter assembly 600 may also be used with other embodiments.

Figure 15:
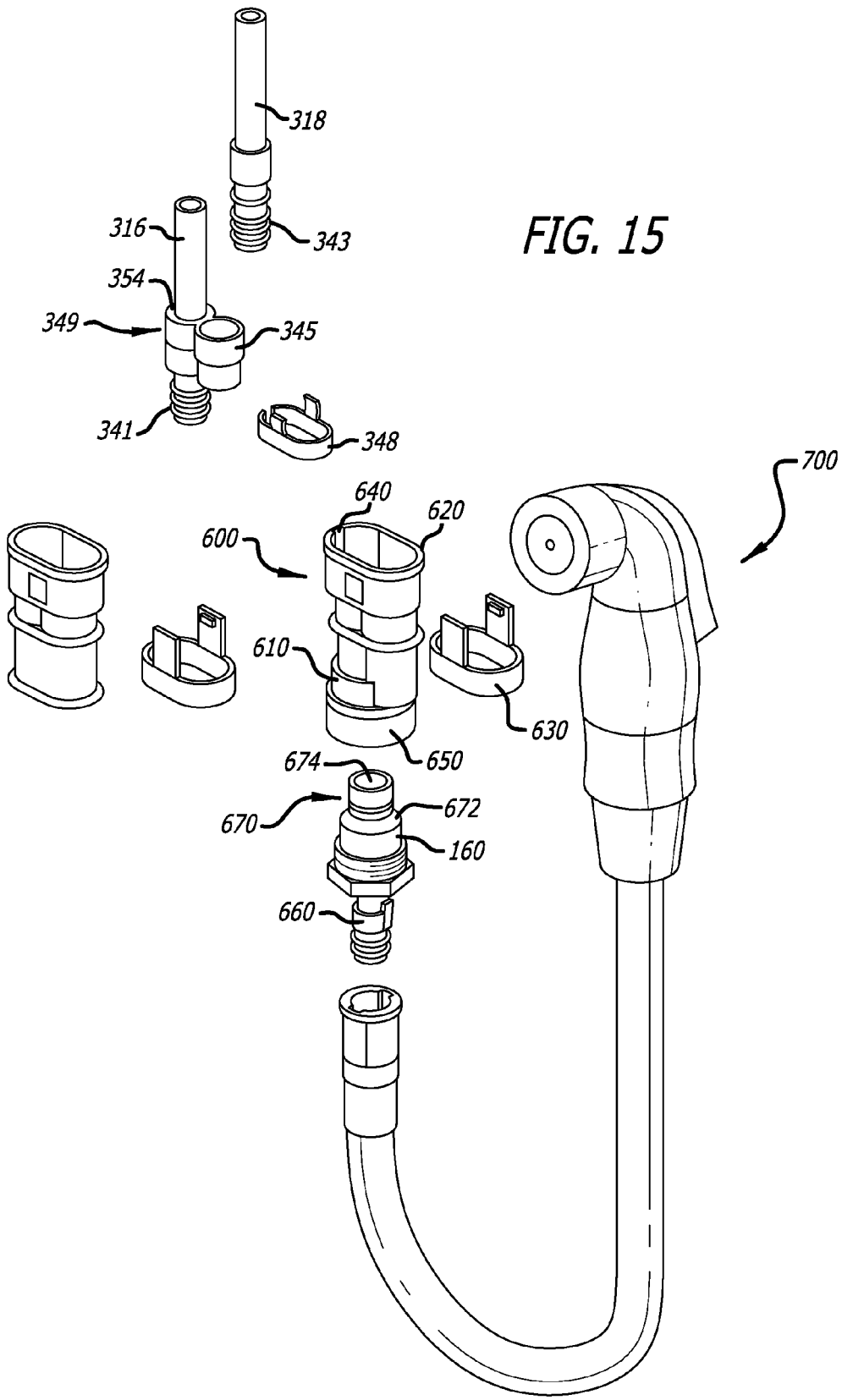
FIG. 15 is an exploded perspective view of a diverter valve assembly.
Figure 16:
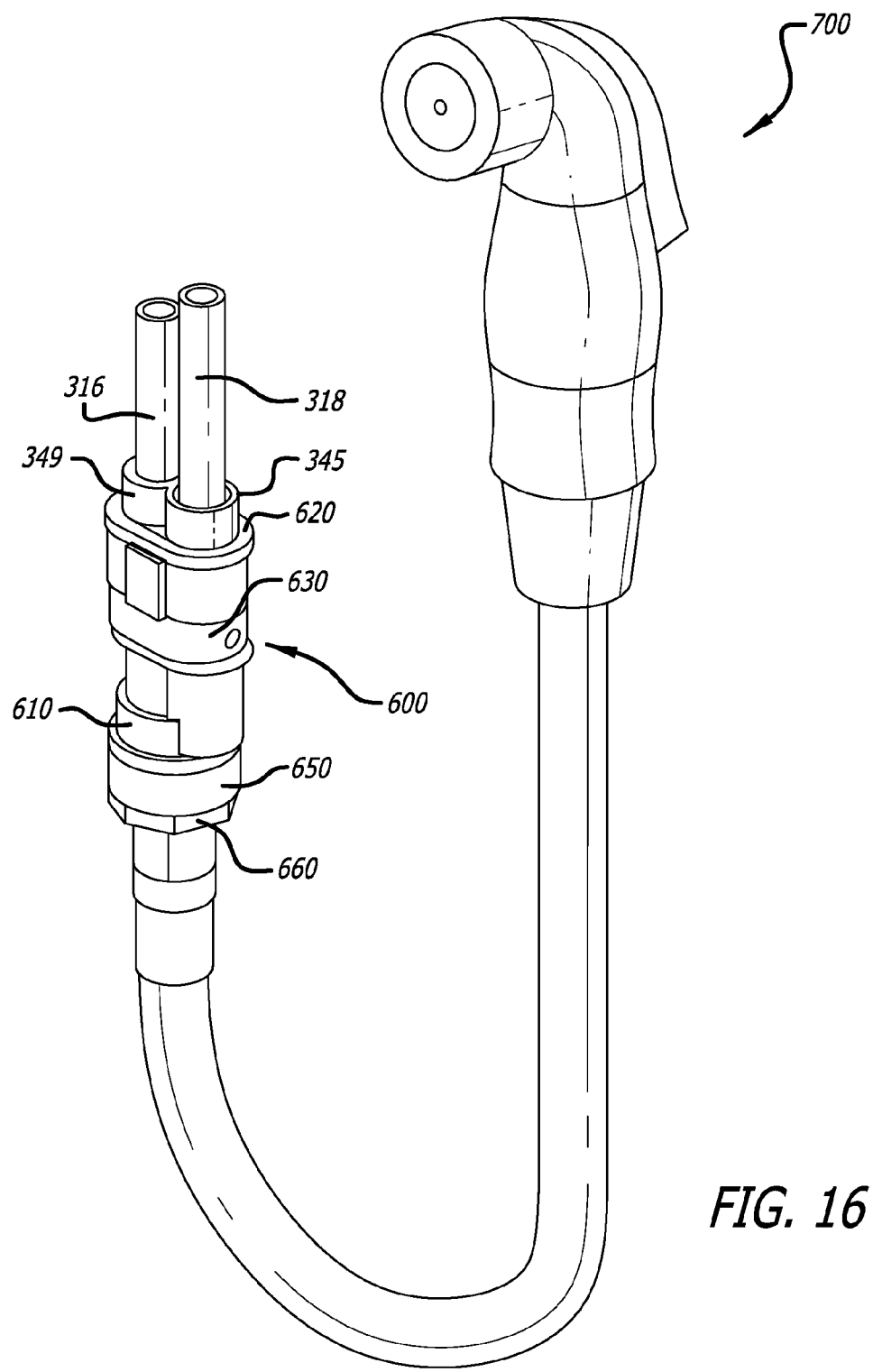
FIG. 16 is a perspective view of an assembly of the components of FIG. 15.

FIG. 15 depicts the diverter assembly 600 of the invention, and its use with the embodiment of FIG. 1. Particularly, second end portions 341 and 343 of the third and fourth tubes 316 and 318 may be connected to the diverter assembly 600. This permits a user to select fluid delivery through either a sprayer assembly 700 or a delivery spout 210.

For purposes of stability and compactness, second end portions 341 and 343 may be secured to each other by any suitable attachment member. For example, as may best be seen in FIG. 15, a second molded junction portion 349 may serve as the attachment member. In this embodiment, this second molded junction portion 349 is molded around a portion of the third tube 316.

As may further be seen in FIG. 15, this second molded junction portion 349 has a receiving channel 345. This receiving channel 345 is configured to slidably receive the second end portion 343 of the fourth tube 318. A tube locking member 348, such as a clip, may be attached to the second molded junction portion 349 to retain the second end portion 343 to the second molded junction portion 349.

Instead of using the above-described second molded junction 349 with a receiving channel 345, the second end portions 341 and 343 may be over-molded together. Alternatively, the second end portions 341 and 343 may be attached to each other by any other suitable means, such as with a clamp or adhesive.

Any of the above-described means of attaching second end portions 341 and 343 together enable those portions to be connected to the diverter assembly 600 as a single first quick connection.

A diverter housing 610 is best shown in FIG. 15. The diverter housing 610 has a first end 620 that is sized and shaped to sealingly receive the second end portions 341 and 343. Each of the second end portions 341 and 343 may have one or more sealing members 160 (see FIG. 17). The sealing members 160 are O-rings that ensure a fluid-tight connection.

A housing locking member 630 is configured to releasably retain the second end portions 341 and 343 within the diverter housing 610. The housing locking member 630 may be a separate component, such as a clip. Alternatively, the housing locking member 630 may be an integral portion of the diverter housing 610.

The diverter housing 610 may also have a first alignment member 640, such as a groove, a channel or a notch. This first alignment member 640 is sized and shaped to accommodate a complementarily shaped and sized second alignment member 354 in the second molded junction portion 349. The second alignment 354 member may be a finger or protrusion.

FIG. 15 also shows that the diverter housing 610 includes a second end 650 that is sized and shaped to sealingly receive a quick connector 660. The quick connector 660 may be connected to a sprayer assembly 700 (e.g., side spray hose of a kitchen faucet).

Thus, the diverter housing 610 is configured to have two quick connections, allowing for easier assembly and disassembly.

FIG. 15 further depicts a valve assembly 670. Valve assembly 670 is contained within the diverter housing 610. Valve assembly 670 functions to divert fluid entering the diverter housing from third tube 316 to either of two locations. Particularly, when the user selects the faucet deliver spout 210, the valve assembly 670 diverts the incoming fluid from the third tube 316 to the fourth tube 318. In contrast, when the user selects the sprayer assembly 700, the valve assembly 670 diverts the incoming fluid from the third tube 316 to the quick connector 660.

The valve assembly 670 of FIG. 15 has a valve housing 672 that is sized and shaped to be inserted through the second end 650 of the diverter assembly 600. The valve housing 672 may also include one or more water-tight O-ring style sealing members 160. As a result, the valve housing 672 and sealing members 160 are friction-fitted into the diverter assembly 600 through this second end 650. This results in a liquid seal between the valve assembly 670 and the diverter housing 610, and the secure retention of the valve assembly 670 within the diverter housing 610.

Figure 17:
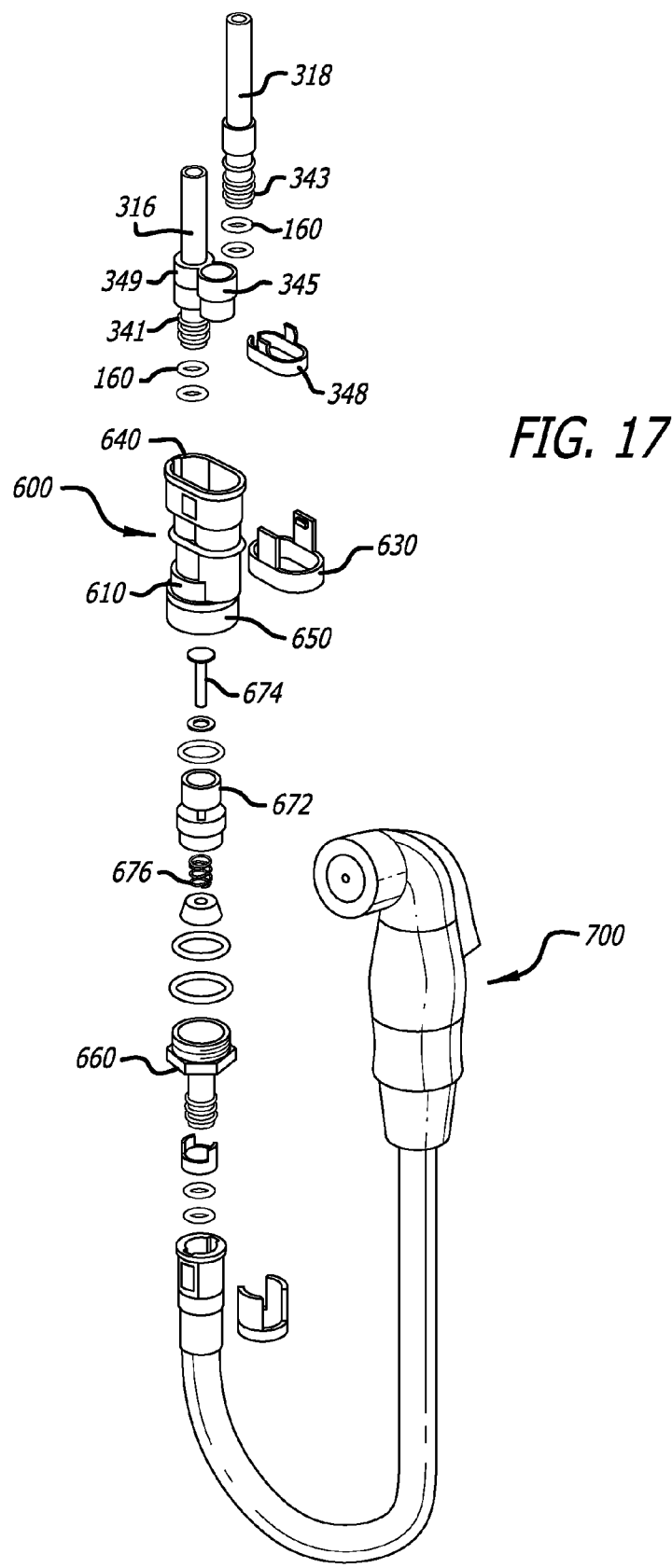
FIG. 17 is another exploded perspective view of the diverter valve assembly of FIG. 15.
Figure 18:
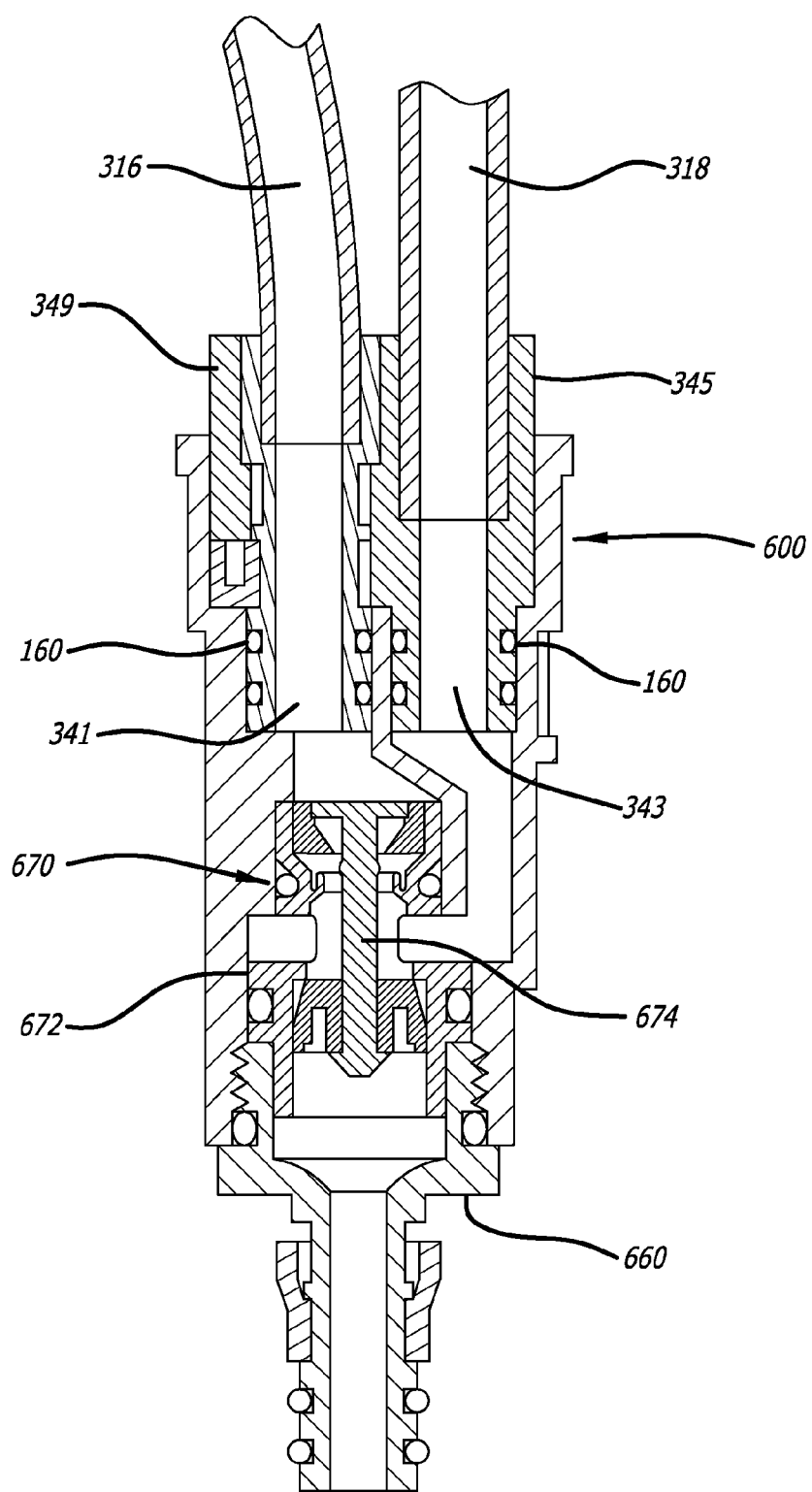
FIG. 18 is a cross-sectional side view of the diverter valve assembly of FIG. 15.

Referring to FIG. 17, the valve housing 672 also includes a movable valve 674, and a biasing member 676 such as a spring, which biasing member 676 holds the movable valve 674 in a first position. During operation, the movable valve 674 may be moved to a second, lowered position due to a force that overcomes the force exerted by the biasing member 676. Such force can be exerted by water pressure acting upon the face of the movable valve member 674.

The valve assembly 670 of FIG. 15 may also be placed within the diverter housing 610 by attaching the quick connector 660 to the housing. Particularly, a threaded end of the quick connector 660 may be screwed into complementary threading that is formed within the second end 650 of the diverter housing 610.

The modular nature of the diverter assembly 600 allows for quick and easy replacement of its component parts, without having to replace the entire diverter assembly 600. For example, if the diverter housing 610 is cracked or damaged, or the valve assembly 670 becomes fouled, either the diverter housing 610, or the valve assembly 670, or the entire diverter assembly 600 can be quickly replaced using the two quick connections, while leaving the faucet tube assembly 310 and the side sprayer assembly 700 in place.

Figure 19:
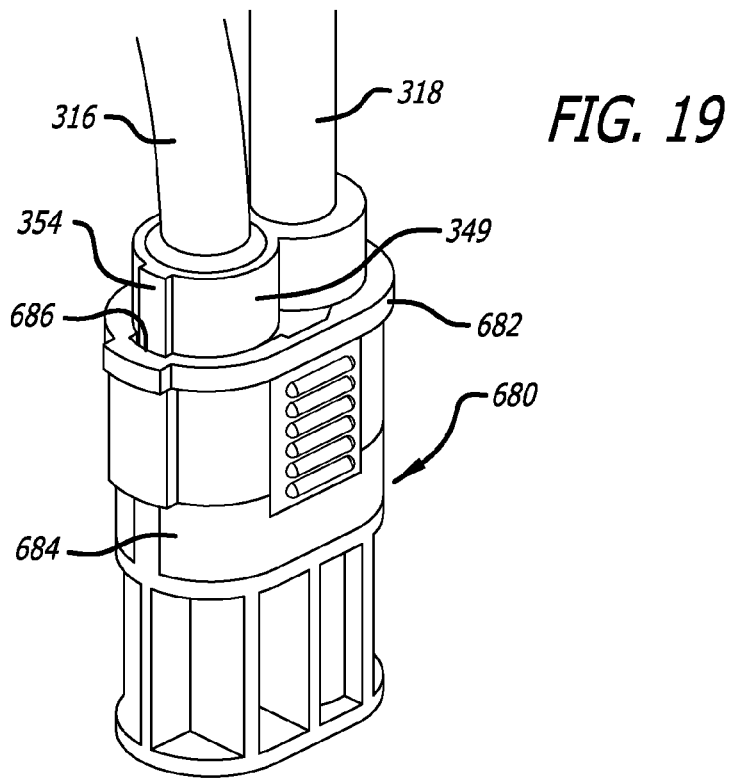
FIG. 19 is a perspective view of another embodiment of a diverter valve assembly.
Figure 20:
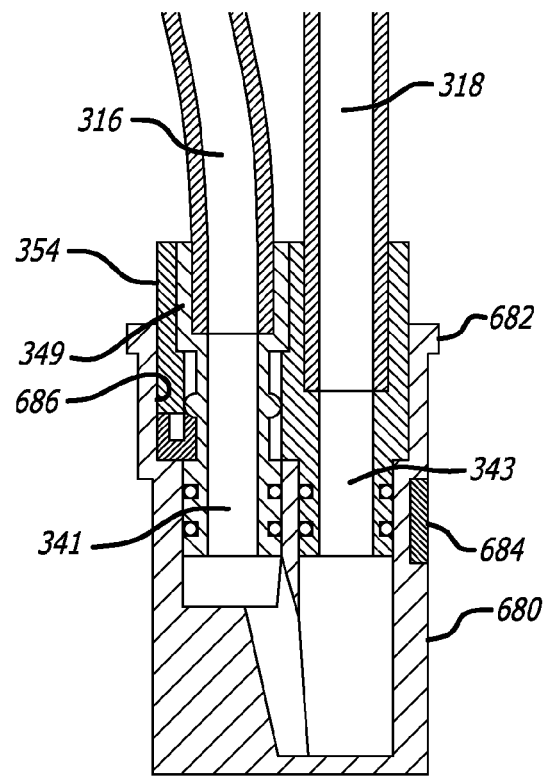
FIG. 20 is a cross-sectional front view of the assembly of FIG. 19.

As seen in FIGS. 19 and 20, a plug 680 may be used in place of the diverter assembly 600, if the faucet assembly does not include a side sprayer assembly 700. The plug 680 has a first end 682 that is sized and shaped to sealingly receive the second end portions 341, 343 (see FIG. 20) of tubes 316 and 318, respectively. A plug locking member 684 is configured to releasably retain the second end portions 341, 343 within the plug 680. The plug locking member 684 may be a separate component, such as a clip. Alternatively, the plug locking member 684 may be an integral portion of the plug 680.

As may further be seen in FIG. 19, the plug 680 may have a first alignment member 686, such as a groove, a channel or a notch. The first alignment member 686 is configured to matingly connect with the second alignment member 354 of second molded junction portion 349 (FIG. 15). The plug 680 is configured to route fluid directly from the third tube 316 to the fourth tube 318.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention.

The invention claimed is:

1. A fluid delivery assembly for use with a first fluid discharge fixture, the fluid delivery assembly comprising:
a housing comprising at least one fluid inlet and at least one fluid outlet;
at least one tube assembly defining at least one fluid flow path, wherein a first portion of the tube assembly is configured to connect to a fluid source line, and wherein a second portion of the tube assembly is configured to connect to the housing;
wherein the tube assembly comprises:
a first tube defining a fluid pathway from a first fluid source to the housing;
a second tube defining a fluid pathway from a second fluid source to the housing; and
a third tube defining a fluid pathway from the housing to a second fluid discharge fixture, wherein a portion of the first tube and a portion of the second tube are molded together to form a molded junction portion, and wherein the molded junction portion comprises a receiving channel configured to slidably receive the third tube; and
a retaining assembly to secure the tube assembly and the housing, wherein the retaining assembly is configured to be engaged or disengaged by hand without the use of tools, and wherein the housing, the tube assembly, and the retaining assembly are separate components that are not integrally formed together.

2. The fluid delivery assembly of claim 1, further comprising a cartridge housing configured to receive a fluid flow cartridge.

3. The fluid delivery assembly of claim 1, wherein the tube assembly is comprised of PERT plastic tubing and the housing is comprised of plastic.

4. The fluid delivery assembly of claim 2, wherein the retaining assembly comprises:
a mounting member sized and shaped to receive a portion of the housing, wherein a portion of the mounting member is threaded; and
a securing member, wherein a portion of the securing member is threaded, and wherein the threaded portion of the mounting member is configured to cooperatively engage with the threaded portion of the securing member to secure the tube assembly to the housing.

5. The fluid delivery assembly of claim 4, wherein the retaining member is a mounting shank comprised of metal, and wherein the securing member is a mounting nut comprised of metal.

6. The fluid delivery assembly of claim 5, wherein a portion of the mounting shank is internally threaded and a portion of the mounting nut is externally threaded.

7. The fluid delivery assembly of claim 2, wherein the tube assembly further comprises:
a fourth tube defining a fluid pathway from the housing to the first fluid discharge fixture
wherein the molded junction portion comprises an alignment member configured to receive the fourth tube.

8. The fluid delivery assembly of claim 7, wherein a first fluid flows from an angle valve of the first fluid source, through the first tube into the housing, and into a fluid flow cartridge, wherein a second fluid flows from an angle valve of the second fluid source, through the second tube into the housing, and into a fluid flow cartridge, wherein the first and second fluids are mixed in the fluid flow cartridge and the mixed fluid flows through the housing to one of the delivery spout and a sprayer, wherein to reach both the delivery spout and the sprayer the mixed fluid flows from the fluid flow cartridge to the housing to the third tube to a diverter assembly.

* * * * *